US010294669B2

(12) United States Patent
Prygon

(10) Patent No.: US 10,294,669 B2
(45) Date of Patent: May 21, 2019

(54) METHOD OF WATERPROOFING BUILDING ROOFS AND BUILDING PANELS

(71) Applicant: Breghtway Construction Solutions, LLC, Fort Worth, TX (US)

(72) Inventor: William Prygon, Fort Worth, TX (US)

(73) Assignee: Breghtway Construction Solutions, LLC, Fort Worth, TX (US)

( * ) Notice: Subject to any disclaimer, the term of this patent is extended or adjusted under 35 U.S.C. 154(b) by 0 days.

(21) Appl. No.: 15/935,495

(22) Filed: Mar. 26, 2018

(65) Prior Publication Data

US 2018/0245348 A1 Aug. 30, 2018

Related U.S. Application Data

(63) Continuation-in-part of application No. 15/654,188, filed on Jul. 19, 2017, now Pat. No. 9,963,875.

(60) Provisional application No. 62/463,354, filed on Feb. 24, 2017.

(51) Int. Cl.
| E04D 7/00 | (2006.01) |
| E04F 13/08 | (2006.01) |
| E04B 1/66 | (2006.01) |
| C09D 183/04 | (2006.01) |
| C09D 5/00 | (2006.01) |
| A47K 3/40 | (2006.01) |
| E04F 13/04 | (2006.01) |
| C08K 3/36 | (2006.01) |
| E04B 1/76 | (2006.01) |
| C08K 9/10 | (2006.01) |

(52) U.S. Cl.
CPC ............... *E04D 7/005* (2013.01); *A47K 3/40* (2013.01); *C09D 5/00* (2013.01); *C09D 183/04* (2013.01); *E04B 1/66* (2013.01); *E04F 13/0885* (2013.01); *C08K 3/36* (2013.01); *C08K 9/10* (2013.01); *E04B 1/7629* (2013.01); *E04F 13/04* (2013.01)

(58) Field of Classification Search
CPC ........ E04D 7/005; C09D 183/04; C09D 5/00; E04F 13/0885; E04F 13/04; E04B 1/66; E04B 1/7629; A47K 3/40; C08K 3/36
See application file for complete search history.

(56) References Cited

U.S. PATENT DOCUMENTS

| 4,668,315 | A * | 5/1987 | Brady | E04D 11/02 156/278 |
| 4,719,723 | A * | 1/1988 | Van Wagoner | E04D 11/02 52/15 |
| 6,256,956 | B1 * | 7/2001 | Davis | E06B 1/62 277/645 |
| 7,441,381 | B2 * | 10/2008 | Scheirer | E04D 5/12 428/40.3 |
| 7,721,488 | B1 * | 5/2010 | Bennett | E04F 13/0889 52/302.6 |
| 7,836,652 | B2 * | 11/2010 | Futterman | E04F 13/02 52/393 |

(Continued)

*Primary Examiner* — Brent W Herring
(74) *Attorney, Agent, or Firm* — Whitaker Chalk Swindle & Schwartz PLLC; Stephen Mosher

(57) ABSTRACT

A sealing method developed for a roofing system alternative to conventional asphalt shingles or metal roof coverings and for sealing walls and floors for tiled surfaces such as shower stalls and the like. The concepts described herein are readily applicable to waterproofing most kinds of walls, ceilings, roofs and floors, and any fixtures or other components that must pass through the wall, ceiling, roof or floor.

8 Claims, 11 Drawing Sheets

(56) References Cited

U.S. PATENT DOCUMENTS

| | | | | |
|---|---|---|---|---|
| 7,971,403 B2* | 7/2011 | Meier | ................... | B32B 15/06 428/391 |
| 8,603,629 B2* | 12/2013 | Simpson | ................ | B32B 37/02 156/280 |
| 8,789,329 B2* | 7/2014 | Radoane | ................... | E04B 2/58 52/309.5 |
| 9,228,348 B2* | 1/2016 | Radoane | ................... | E04B 2/58 |
| 9,347,215 B2* | 5/2016 | Simpson | ................ | B32B 37/02 |
| 9,458,631 B2* | 10/2016 | Radoane | ................... | E04B 2/58 |
| 2003/0126806 A1* | 7/2003 | Ellis | ......................... | E04B 7/20 52/95 |
| 2004/0025462 A1* | 2/2004 | Meier | ................... | B32B 15/06 52/412 |
| 2005/0126103 A1* | 6/2005 | Scheirer | ................... | E04D 5/12 52/518 |
| 2006/0123736 A1* | 6/2006 | Futterman | .............. | C04B 26/06 52/742.16 |
| 2007/0101664 A1* | 5/2007 | Hoy | ................... | E04D 13/1407 52/198 |
| 2010/0071292 A1* | 3/2010 | Futterman | ............... | E04F 13/02 52/412 |
| 2011/0091675 A1* | 4/2011 | Simpson | ................ | B32B 37/02 428/40.3 |
| 2011/0258944 A1* | 10/2011 | Radoane | ................... | E04B 2/58 52/62 |
| 2012/0317914 A1* | 12/2012 | Bomberg | ................ | B32B 37/02 52/443 |
| 2014/0059953 A1* | 3/2014 | Simpson | ................ | B32B 37/02 52/173.1 |
| 2014/0298744 A1* | 10/2014 | Radoane | ................... | E04B 2/58 52/411 |
| 2015/0267413 A1* | 9/2015 | Hull | ................... | E04D 13/1476 52/58 |
| 2015/0292196 A1* | 10/2015 | Radoane | ................... | E04B 2/58 52/62 |
| 2016/0305120 A1* | 10/2016 | Radoane | ................... | E04B 2/58 |

* cited by examiner

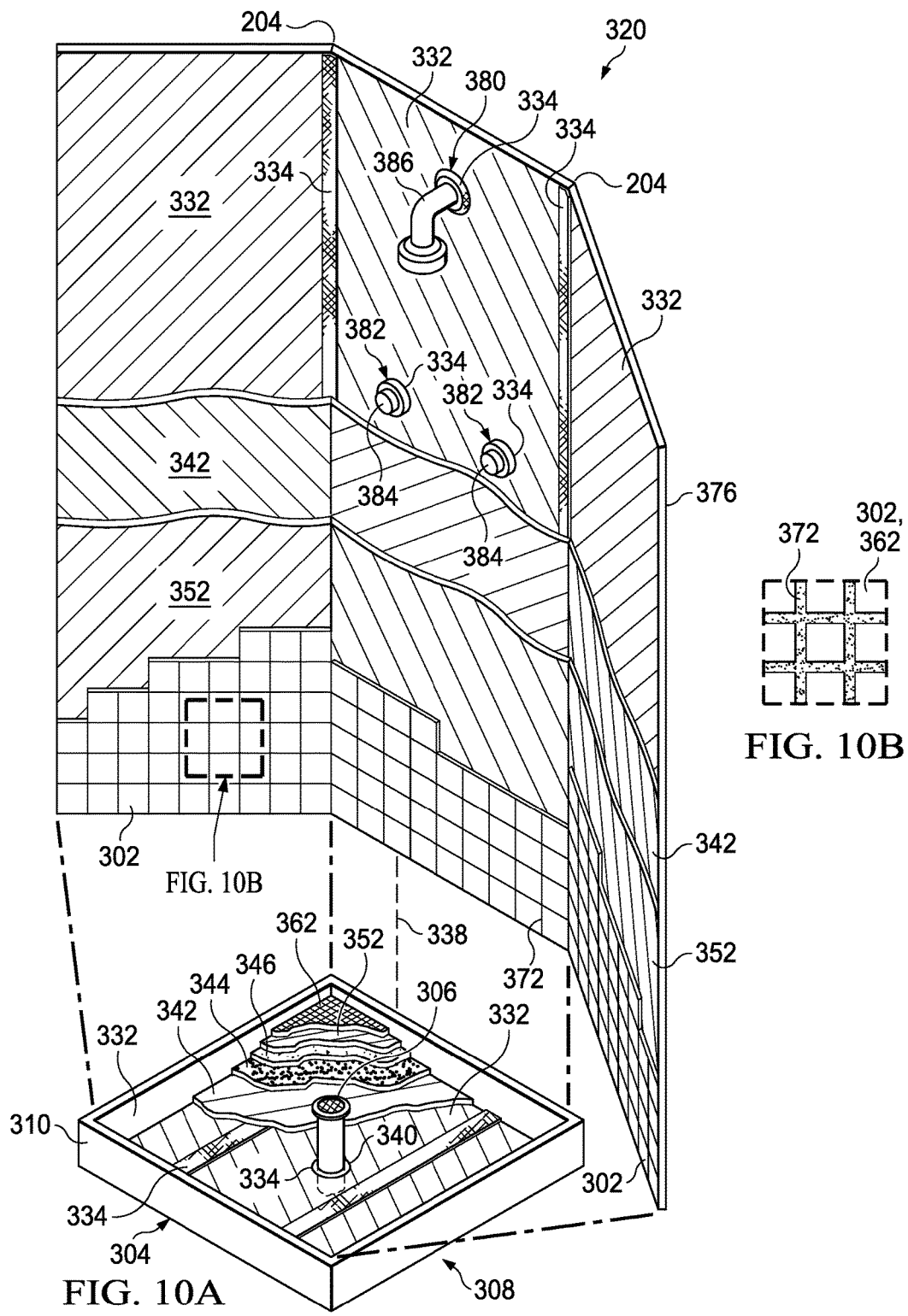

METHOD OF WATERPROOFING BUILDING ROOFS AND BUILDING PANELS

CROSS REFERENCE TO RELATED APPLICATION

This Application is a Continuation-In-Part of U.S. patent application Ser. No. 15/654,188 filed Jul. 19, 2017 by the same inventor and entitled EXTERIOR WALL CLADDING SYSTEM FOR BUILDINGS. This application further claims priority to U.S. Provisional Patent Application, Ser. No. 62/463,354 filed Feb. 24, 2017 and entitled STUCCO SYSTEM, filed by the same inventor. This Application is related to Application by the same inventor entitled INSULATING PANEL FOR STUCCO EXTERIOR, which is a Continuation of U.S. patent application Ser. No. 15/654,188.

BACKGROUND OF THE INVENTION

1. Field of the Invention

The present invention generally relates to the construction of building exteriors and more particularly to a system and method for constructing a cladded exterior wall of a building such as a stucco exterior wall to seal the wall and prevent damage from the ingress of water and insects into the structure of the exterior wall. The system and method may also be adapted to constructing sealed roof surfaces resistant to hail damage and to constructing and sealing interior and exterior walls covered with ceramic and synthetic tiles.

2. Background of the Invention and Description of the Prior Art

The exterior walls of residential and commercial buildings are clad with a variety of material s and construction. Apart from structural considerations, the cladded exterior walls of such buildings must withstand all sorts of weather, in a wide-ranging gamut of temperatures, water and other forms of precipitation, wind, solar radiation, and other meteorological conditions. Other considerations include resistance to damage by insects and other animals or by plants and trees. In addition, to conserve energy it is crucial that such walls be well insulated against the transmission of heat through the walls.

In a typical building, for example, a wood-framed residential house, the wood framework is covered with a wall sheathing secured to the wood framework. Such exterior wall sheathing may be wood panels or composite wood-based or felt or pressed-fiber panels, sometimes covered with a heavy paper or moisture barrier. The outside surface of the exterior walls may then be covered or clad with siding materials of wood, metal, or synthetic materials; thick or stone work; or a stucco wall system.

In a conventional process, stucco is a composition of aggregates, water, and a binder that is prepared and applied as a thick liquid or slurry to a surface, usually in several coats, and allowed to harden into a dense, hard surface that is generally durable and weather-resistant. The aggregate material is typically lime, although sand, synthetic aggregates, glass fibers, or Portland cement are commonly used. The wall surface to which the stucco mixture is applied is generally prepared by installing lath—a type of lattice or wire mesh to support the wet mixture as it hardens.

While stucco is a versatile material, that also lends itself to many decorative treatments, it is brittle and its long term durability depends substantially on the skill of the craftsman employed to apply it. It is susceptible to cracking as a building structure settles, flexes with movement of the earth, similarly to gypsum wall board, etc. Thus, unless openings in the stucco coating are properly finished, particularly along the top and bottom edges, around pass-through fixtures for plumbing or electrical lines, windows and doors, etc., the integrity of a stucco exterior may be seriously weakened. Moreover, one commonly used construction technique requires formation of a drainage plane between the exterior wall and the insulating panel (or the stucco layers if no insulating panel is used). An example of this system is the so-called Exterior Insulation and Finish System or "EIFS."

The EIFS structure requires a drainage plane formed by vertical passages on the back side of insulating panels that are included between the exterior wall and the stucco layers. The drainage plane provides passages in a thin space between the exterior wall sheathing and an insulating panel, either with grooves formed in the back side of the insulating panel or by troweling vertical paths in the adhesive layer that is used to secure the insulating panel to the exterior wall surface. The passages thus provided theoretically allow drainage of water that may find its way inside the wall so that it does not accumulate and cause damage to the wall (e.g., rot) or accumulation of fungal substances (e.g., "mold"). However, unless the EIFS structure is properly installed, the symptoms of water condensation or accumulation in the thin drainage plane spaces, or insect (e.g., termite) damage, or even mold contamination may go unnoticed—often for years—until the damage is so severe that the wall must be entirely removed and replaced to repair the damage. Accordingly, the formation of the drainage plane, and the long-term durability of the EIFS structure depends critically on the proper formation of the thin space between the exterior wall and the insulating panel of stucco. For example, if the space is too thin, water may become trapped in the space due to surface forces. Or, if the drainage spaces formed by troweling are not all vertically-oriented, water may become trapped within the non-vertical portions of the drainage spaces.

Thus, in balance, stucco exterior walls, whether constructed according to conventional methods or the EIFS method, are susceptible to substantial damage due to water originating generally from weather events. Such events provide numerous and varied opportunities for water to enter, and become trapped in the interstices of an exterior wall, especially stucco exterior walls. Experience with repairing damage to stucco-clad exterior walls demonstrates that it is not enough to (1) install a stucco exterior wall surface by conventional methods without limiting opportunities for water to find its way into the stucco structure through openings, cracks or other defects. It is not enough to (2) use a finish coat of flexible acrylic as is sometimes recommended—to cover the exterior so that when cracks develop they are "bridged" by the flexible coating. It is not sufficient to (3) include drainage planes that provide thin spaces for moisture to condense or collect and that are sensitive to the process technique(s) required to install them properly. It is not enough to (4) provide a weep screed at the lower edge of the stucco wall if that portion of the wall is susceptible of pooling water or the screed is improperly installed.

There is thus a need for a system and method for constructing exterior wall cladding, including stucco finishes, which provides a wall that is thoroughly waterproof, does not allow the ingress of water or moisture, and is able to withstand all kinds of contacts with water in any form without loss of integrity or durability.

In another domain of building construction of walls and roof surfaces subject to damage from water and weather, traditional construction techniques typically employ sheets of membrane material as vapor barriers or to wrap or cover surfaces, usually under a rated composition roofing material such as asphalt shingles, cedar shakes, metal roof coverings, etc. that may be subject to standing water, hail impacts, and wet environments such as showers and the like. Often some surfaces of a building's walls, floor, or ceiling or roof lack sealing to ensure that water does not pass through them.

SUMMARY OF THE INVENTION

A wall cladding system for application to an exterior wall surface comprises a sealed waterproof wrap applied to the exterior wall surface; a fully-sealed insulating panel without a drainage plane disposed over the laminated waterproof wrap; and a multi-layer stucco coating applied to the insulating panel.

In one aspect the sealed waterproof wrap comprises a coat of silicone elastomeric (SE) roof coating; an L-shaped flashing formed of anti-fracturing fiber cloth (AFF cloth) attached to the lower edge of the coated exterior wall surface; a wrap of AFF cloth covering to seal all openings in the exterior wall surface; and the SE roof coating applied to the covered openings.

In another aspect the fully sealed insulating panel without drainage plane comprises an insulating panel, without drainage plane grooves, coated with the SE roof coating on its back side and disposed against the sealed waterproof wrap applied to the exterior wall surface and secured with basket screws. The insulating panel further comprises a plurality of closed cell EPS foam sheets joined edge-to-edge, each having dimensions of 3 feet×5 feet and a thickness between one inch and three inches; wherein the edge-to-edge joints are sealed using the AFF and the SE roof coating. Window and door openings may be trimmed to an outward facing angle and sealed with the AFF cloth and the SE roof coating; and utility openings and basket screws sealed with the AFF cloth and the SE roof coating. In addition, the outward facing angle is approximately 45 degrees.

In another aspect the multi-layer stucco coating applied to the insulating panel includes a weep screed disposed to terminate the lower edge of the stucco wall; and a sealed top flashing along the upper edge of the stucco exterior wall. In this aspect the multi-layer stucco coating may comprise a base coat of Portland cement, type I-II mixed with a cement adhesive, plus a layer of glass fiber screen embedded therein; a first and a second coat of a synthetic stucco coating; and a finish coat of the SE coating.

In another aspect sealed top flashing comprises a plastic plate configured to disperse water outward away from the exterior wall surface.

In another aspect a curb footing formed of concrete secured and sealed to a foundation structure of the building and against the outer side of the exterior wall surface. In this aspect the curb may comprise a rebar frame secured to the foundation structure with embedded lag screws; a concrete curb footing formed over the rebar frame; and a weep screed attached to the sealed waterproof wrap of the coated exterior wall surface at the lower edge thereof and disposed over the curb footing.

In another embodiment, a stucco exterior all system is disclosed, comprising an exterior wall framed and erected on a foundation and sheathed a sheathing of wood, fiber, synthetic panel material; a laminated and sealed waterproof wrap applied to the surface of the exterior wall, and further including a coat of a silicone elastomeric (SE) roof coating, an anti-fracturing fabric (AFF) taped or wrapped and sealed around all openings, and an L-shaped flashing of AFF applied at the foot of the exterior wall at the intersection of the wrapped wall surface and the foundation; and fully-sealed insulating panel having no drainage plane or surface voids and installed over the laminated and sealed waterproof wrap, wherein the insulating panel is coated with the SE roof coating on the back thereof, and placed against the wrapped wall, and secured with basket screws sealed with silicone caulk inserted in a pilot hole provided for the basket screws; wherein window and door openings are cut at an outward facing angle of approximately 45 degrees outward, sealed with AFF and the SE roof coating and utility openings are sealed with AFF and the SE roof coating; a multi-layer stucco coating applied to the insulating panel, including a first stucco coat, a fiberglass mesh strip disposed against a lower edge of the insulating panel, a second stucco coat, and a coat of the SE coating as a finish coat to the stucco coating; and a top flashing is installed over a wrap of AFF and the SE roof coating disposed along the upper edge of the stucco exterior wall.

In another aspect, a concrete curb may be installed on the foundation at the foot f the exterior wall, including a rebar frame secured to the foundation, the concrete curb formed against the exterior wall over the rebar frame, and a weep screed attached to the laminated and sealed waterproof wrap and disposed against the foot of the exterior wall over the curb.

In another embodiment, a waterproof, insulated structural panel is disclosed for attaching to a building frame for an exterior stucco wall erected on a foundation, comprising a rigid sheathing attached to an exterior side of the building frame; and an insulating panel, supplied without drainage grooves, applied to the rigid sheathing using a bonding structure applied to the sheathing side of the insulating panel; wherein the insulated structural panel is characterized by the absence of any interlayer spaces or voids between the insulating panel and the sheathing and a sealing composition applied to any penetration or passage through the insulated structural panel.

In another aspect, the bonding structure comprises a first coat of a liquid silicone elastomeric roof coating applied to the outer side of the sheathing a strip of an anti-fracture fabric formed into an L-shape flashing, a first side disposed against the foot of the sheathing and a second side disposed against the foundation; and a second coat of the silicone elastomeric roof coating applied to the sheathing and the first side of the L-shaped flashing.

In another aspect, the insulating panel comprises an expanded polystyrene foam sheet having a defined thickness, width, and length, and a rated insulating "R" value; wherein both sides of the sheet are free of drainage grooves or other features forming a drainage plane having surface voids.

In yet another embodiment an alternative roofing system for a roof formed by a plurality of decking panels installed over a framed structure, the panels joined at edge-to-edge seams, comprising: a waterproof wrap constructed of at least a first coat of a liquid silicone elastomeric (SE) roof coating applied to the decking panels and adjoining surfaces of vents and chimneys; a flashing strip formed of anti-fracture fabric (AFF) applied to the first coat of roof coating over all edge-to-edge seams, vents and chimneys, thereby forming a continuous cover aver all openings in the roofing system a second coat of the SE roof coating applied over the waterproof wrap and the flashing strip, thereby forming a fully sealed and waterproofed surface on the roof; a third coat of the SE roof coating applied over the second coat of the SE roof coating; and a coating of washed silica sand is deposited on the third coat of the SE roof coating at a rate of approximately 10 pounds per hundred square feet.

In yet another embodiment a method of installing a tiled surface on a floor of a shower stall prepared with a drain set into a slab foundation and boxed to define the floor of the shower stall, comprising the steps of: applying a waterproof wrap constructed of at least a first coat of a liquid silicone elastomeric (SE) roof coating applied to the slab foundation within the box; applying a flashing strip formed of anti-fracture fabric (AFF) disposed against all edge seams formed by adjoining panels of the slab foundation and the shower floor box, and over all openings through the slab foundation around the drain, thereby forming a continuous cover over all seams and openings; applying a second coat of the SE roof coating over the waterproof wrap and the flashing strip; spreading an open layer of gravel aggregate over the second coat of roof coating; forming a concrete shower pan over the covered slab foundation and the inner sides of the box; applying a third coat of roof coating over the concrete shower pan to provide a full membrane seal over the shower pan; while the third coat of the SE roof coating is still wet, installing tiles in position against the coated shower pan until coverage with the tiles is completed; and apply using a trowel to float a mixture of SE roof coating and washed silica sand as a grout in each joint formed by adjoining tiles installed on the substrate.

In yet another embodiment a method for installing a tiled surface on a building wall formed by a drywall or sheathing substrate, comprising the steps of: applying a waterproof wrap constructed of at least a first coat of a liquid silicone elastomeric (SE) roof coating applied to the substrate; applying a flashing strip formed of anti-fracture fabric (AFF) disposed against all edge seams formed by adjoining panels of the substrate, and over all openings through the substrate, thereby forming a continuous cover over all seams and openings; applying a second coat of the SE roof coating over the waterproof wrap and the flashing strip, thereby forming a fully sealed and waterproofed surface over the substrate; while the second coat of the SE roof coating is still wet, installing each tile in position against the coated substrate until intended coverage of the substrate with tiles is completed; and apply using a trowel to float a mixture of SE roof coating and washed silica sand as a grout in each joint formed by adjoining tiles installed on the substrate.

BRIEF DESCRIPTION OF THE DRAWINGS

FIG. 10A illustrates an exploded perspective view of components of a tiled shower stall constructed according to the methods of the present invention; and FIG. 10B illustrates an enlarged arrangement of tiles of the tiled shower stall of FIG. 10A.

DETAILED DESCRIPTION OF THE INVENTION

Introduction

Figure 1:
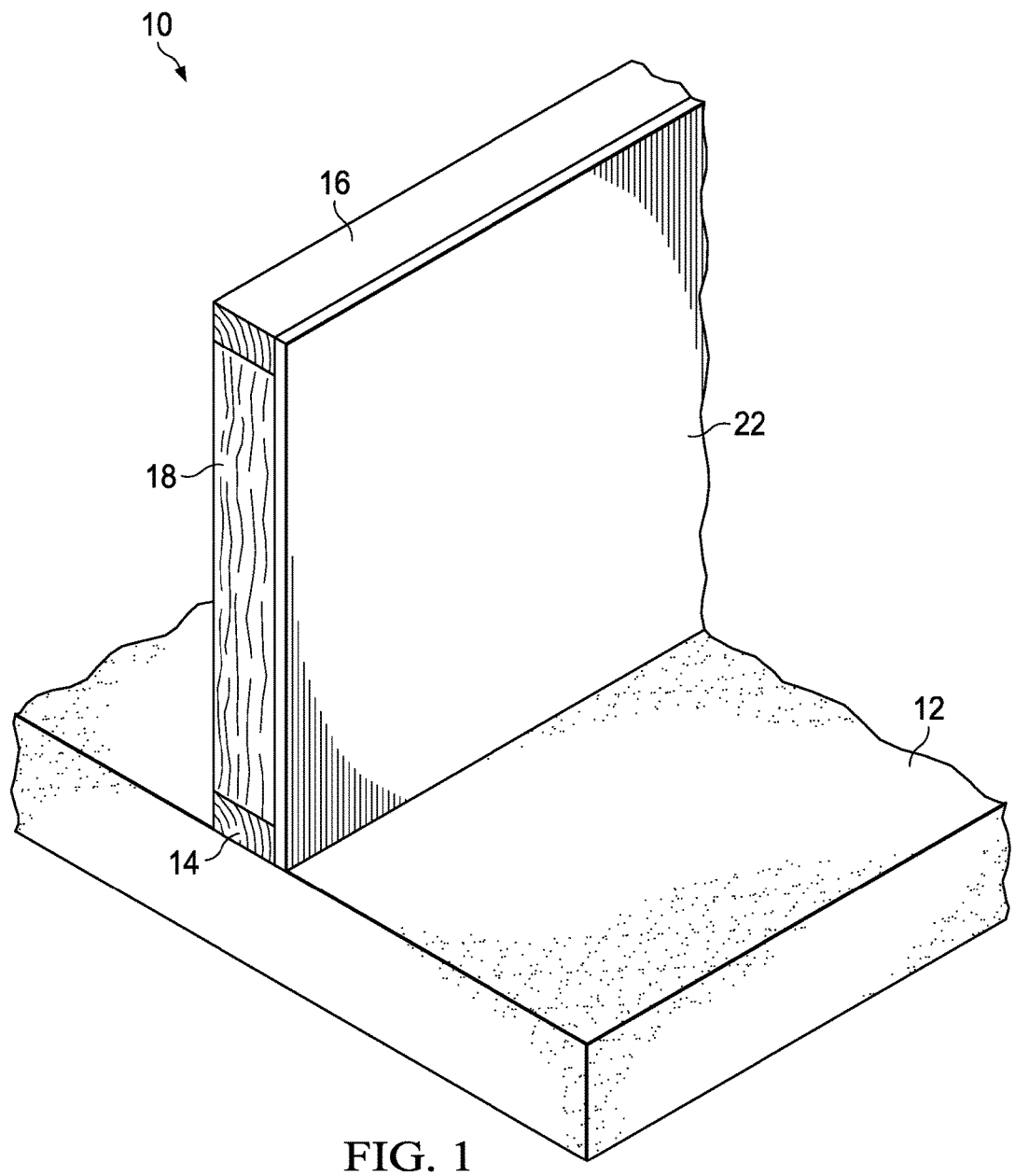
FIG. 1 illustrates a simplified perspective view of a residential building wall erected on a slab foundation.

The invention to be described herein provides advances in the state of the art for improved exterior wall cladding systems and wall sealing methods that solve the problems noted in the Background of the Invention herein. These problems with conventional stucco exterior, roofs, and interior ails are summarized as follows. It is not enough to (1) install a stucco exterior will surface by conventional methods without limiting opportunities for water to find its way into the stucco structure through openings, cracks or other defects. It is not enough to (2) use a finish coat of flexible acrylic—as is sometimes recommended—to cover the exterior so that when cracks develop they are "bridged" by the flexible coating. It is not sufficient to (3) include drainage planes that are sensitive to the process technique(s) required to install them properly. It is not enough to (4) provide a weep screed at the lower edge of the stucco wall if that portion of the wall is susceptible of pooling water or the screed is improperly installed. Further, (5) in the case of roofs and interior tiled wafts it is not enough to apply metal flashings to joints between roof decking or drywall wall panels.

Each of the problems with stucco exterior wall cladding, roofs, and tiled interior walls enumerated in the previous paragraph may be the source of substantial water damage if the conventional installation techniques and remedies are not properly installed or constructed. Many if not all of these problems arise for at least one or two—and sometimes both—of the following reasons. One, failure to properly seal all possible openings where moisture can enter the wall system; and two, the inclusion in a wall or panel structure of space where water can condense or accumulate. Some of the construction techniques developed to deal with these problems include the use of metal flashing strips at joints between roofs and walls, around openings such as doors and windows, and at the lower edges of wall cladding. Often these flashing strips, which are susceptible to corrosion even though galvanized or otherwise treated with corrosion-inhibiting surfaces, are augmented by caulking applied to seal an gaps that may remain after the metal flashing is installed. Another construction design is to provide features that encourage drainage of moisture from within a wall system, either by providing clear vertical passages in the space between layers of the wall system, and a variant of flashing called a weep screed at the bottom edge of a wall cladding intended to provide a draining surface for moisture that may exist within the layers of a wall cladding.

During rehabilitation of exterior walls of buildings heavily damaged by water that found its way inside wall systems through unsealed openings and accumulated because there was no efficient drainage, these and other problems suggested the need to rethink the entire process of how exterior walls are constructed and clad with the surfaces to protect the walls and provide attractive appearance. The first key insight was to realize that providing or allowing spacing or voids between the layers of an exterior wall is an invitation to water damage. The second key insight was to realize that failure to seal all possible openings between the interior and exterior of a building against water ingress, even though the wall system is not a stucco wall that is conventionally installed with a drainage plane within the wall, is also an invitation to water damage. Water damage to an exterior wall system may go unnoticed for many years, leading to failure of the wall, rotting of wood or other materials, accumulation of mold that is often a hazard to the health of the building occupants. Moreover, unsealed openings can permit infestation by insects or even other small animals, bringing potential health hazards to the building occupants and structural damage such as caused by termites.

The solution to both kinds of problems was to eliminate any spaces or voids within the wall system of a building—or even a roof system—where water can condense or accumulate (and insects can enter and thrive), and to fully seal and waterproof all openings in and through the wall system. The methods described herein are illustrated by application to construction of a stucco wall system but the techniques are applicable to any type of wall system or structural panel. The methods employ several synthetic materials and the replacement of some metal flashing materials as sealing elements with a wrap and coat process using synthetic materials. Metal flashing, while suitable for some sealing applications, oxidizes and corrodes overtime, which degrades the seating capabilities of the material, no matter how carefully installed. Caulking materials eventually lose their sealing capability, especially when exposed to climate conditions outside the wall that leads to cracking hardening, and failure of the original sealing effect. Some felt paper under-layments deteriorate over time and lack the ability to seal the surface upon which they are applied. The use of nails, screws, and other fasteners that puncture a cladding material provide opportunities for water to enter. Even some screws and nails, though plated or coated, can degrade or loosen over time, leading to leaks unless properly sealed using techniques to be described herein. Unless these edges, joints, openings, and puncture points are well-sealed with suitable materials, liquid substances, primarily water will find its way in beneath the layers of the wall structure, allowing the process of rotting of the sub-surfaces to begin and weakening the integrity of the wall, panel, or roof cladding.

Solutions to these problems, which are featured in the present invention and disclosed herein are, respectively: (A) the exterior wall in all respects must be sealed against water from the exterior wall surface outward, including the top and bottom of the wall. (B) More than a simple outer of flexible acrylic is required to fully waterproof an exterior wall system, including walls finished with stucco cladding. (C) The simplest way to overcome the problems with drainage planes and other voids is to eliminate them and provide a solid structure that both prevents water from entering the stucco wall structure and eliminates interstitial spaces where water or moisture can accumulate. (D) The weep screed, in addition to proper installation must be supplemented with sealing, either by judicious use of sealing materials or installation of a substantial barrier to moisture ingress at the lower edge of the stucco exterior wall system. These solutions, when implemented with sufficient skill and with synthetic materials carefully selected (but widely available) result in long term durability of the stucco and other cladded wall systems because the opportunities for water to enter wall are eliminated. Further, the use of synthetic materials that have some inherent resilience improves the ability of the finished wall system to resist cracking over time. This novel combination of features, which runs counter to industry-accepted methods, such as the EIFS system, provides a stucco exterior wall system that solves the aforementioned problems. Moreover, elimination of the drainage plane is an essential feature of the invention because the stucco exterior wall system described herein is designed to keep water from ever entering the stucco wall structure. Providing internal spaces for draining water is thus unnecessary and redundant and, when provided may degrade the wall system as described. Similar techniques may be used to significant advantage to provide durable, waterproof roofing surfaces, sealed interior walls, and shower stalls whose walls are surfaced with ceramic tiles.

DETAILED DESCRIPTION

FIG. 1 illustrates a simplified perspective view of a residential building wall 10 erected on a foundation such as a concrete slab, a pier and beam foundation, a foundation structure constructed of wood and or steel structural members, or other suitable base structure. FIGS. 2 through 6 and the accompanying description illustrate one embodiment of a method and system of constructing an improved exterior wall cladding system 20 on a concrete slab foundation, including, for example, a stucco-cladded exterior wall system 20 according to the present invention. Reference numbers appearing in more than one figure identify the same features.

The following list of materials are used in the construction of the exemplary exterior wall cladding system 20 described herein. Some of the materials are available from more than one source. The items in the list are provided as examples of materials that are suitable for use in constructing the present invention. In one case, the Portland Cement and the Foam & Mesh Adhesive and Base Coat are, mixed before use: ½ bag (94 lb.) Portland Cement to 2½ gallons of the Adhesive and Base Coat. This will be called a "cement/adhesive mixture" in the following description.

Silicone Elastomeric (SE) "Gaco Elastomeric" roof coating, two gallon pails—Gaco Western, Waukesha, Wis. 53186.

Anti-fracture Fabric (AFF), 6'×75' rolls—Laticrete International, Inc., Bethany, Conn. 06524.

Expanded Polystyrene (EPS) closed-cell foam, 1½" to 2½" thick, 3'×5' sheets, no drainage grooves—available from several manufacturers.

Portland Cement, Type I-II, 47 or 94 lb. bags—Sakrete, Inc., Charlotte, N.C.

Cement Adhesive, "F&M Foam & Mesh Adhesive and Base Coat," pails—Master Wall, Inc., Midland, Ga. 31808.

Synthetic Stucco Coatings, specified as "DPR Finishes"—Dryvit Systems, Inc., West Warwick, R.I. 02893.

Fiberglass Mesh Drywall Tape, 4.5 oz/sq.yd 36"×150' rolls—PrimeSource Building Products, Inc., Irvine, Tex.

Weep Screed with ⅝" lift—Niles Building Products Company, Niles, Ohio.

In FIG. 1, a structure formed of studs 18, sole plate 14 and top plate 16, and sheathing 22 form a basic building wall 10 erected on a slab foundation 12. As noted above, the foundation 12 may be constructed in a variety of ways, depending on the characteristics of the building site and the style or type of structure to be erected. The sheathing 22 may be plywood or OSB (oriented strand board) panels, gypsum board, fiberboard, rigid foam panels, or diagonal 1"×6" (or 1"×8") boards applied to the framework 14, 16, 18 constructed of wood or metal products on the foundation 12.

Figure 2:
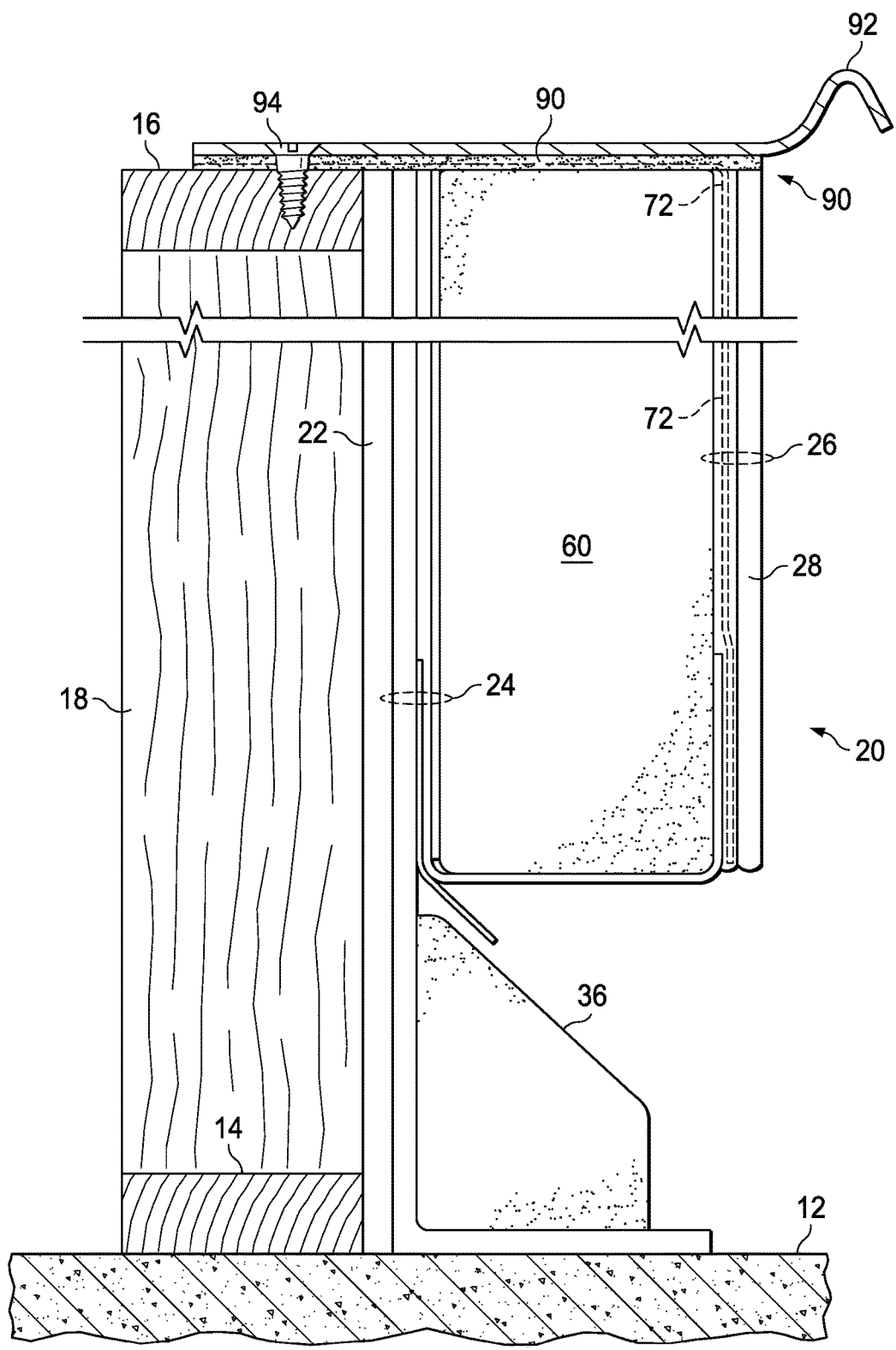
FIG. 2 illustrates a simplified end view of one embodiment of the wall structure of FIG. 1 according to the present invention.

FIG. 2 illustrates a simplified end elevation view of one embodiment of the exterior wall cladding system 20 based on the building wall 10 of FIG. 1 according to the present invention. The exterior wall cladding system 20 may also be called the wall structure 20 or the wall system 20 in the description that follows. The view in FIG. 2 depicts the combination of sheathing 22, inner layers 24, an intermediate insulation layer 60, and outer layers 26 that together form the complete structure of the exterior wall cladding system 20, including the outer stucco finish 28 of the wall system 20. As will be described, all layers 24, 60, and 26 preferably include substantial amounts of sealing involved in their application.

Continuing with FIG. 2, the exterior wall cladding system 20 may include a curb 36 installed at the junction of portions of the inner layers 24 and the foundation 12. This curb 36 will be described in FIGS. 3 and 4. Shown in FIG. 2 is a layer of fiberglass mesh screen 72 (to be described further in FIG. 5) that is wrapped over the top of the wall structure 20 and disposed within the outer layer 26 of the wall structure 20. Upon completion of all layers of the wall structure, including the fiberglass mesh screen 72, a top flashing 92 is installed on the top of the wall structure 20 and secured with screws 94 after coating the top of the wall structure 20 with a liquid silicone elastomeric (SE) 90 (aka SE roof coating herein). The top flashing 92 is typically disposed under the roof (not shown) adjoining the wall structure 20.

Figure 3:
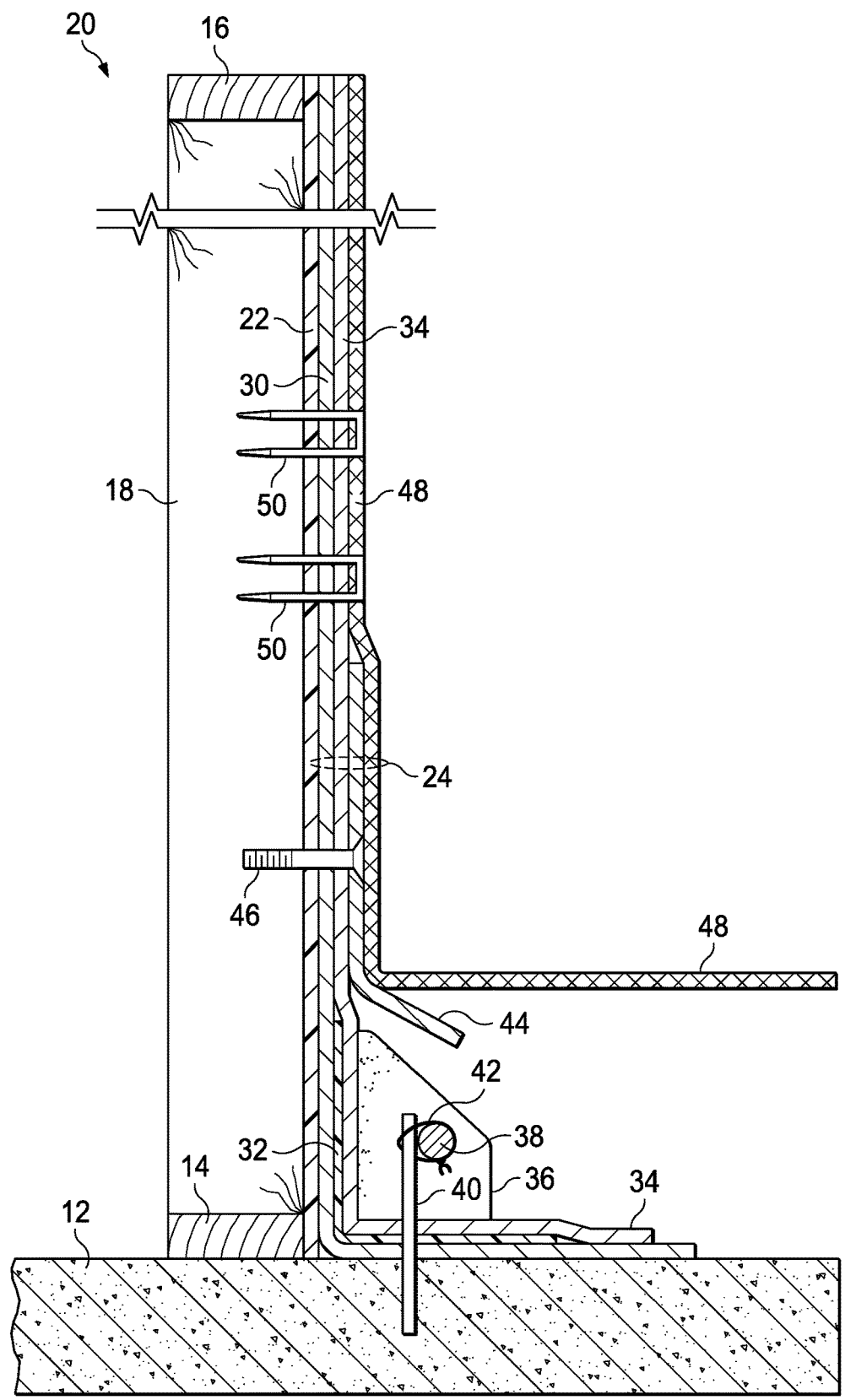
FIG. 3 illustrates an elevation cross section view of the wall structure of FIG. 2 depicting the inner layers of the present invention.

FIG. 3 illustrates an elevation cross section view of the wall structure of FIG. 2 depicting the inner layers 24 of the present invention. This figure primarily depicts the inner layers 24 and the optional curb 36 and related structures. The inner layers 24 are formed as a composite of several layers of material applied in sequence. (1) A coat 30 of SE roof coating on the sheathing 22 from top of the wall to the foundation 12 and extending approximately 8 inches from the foot of the wall; (2) an L-shaped section 32 of AFF applied over the coat 30 on the foot of the wall and extending along both the vertical and horizontal directions approximately 5 inches from the foot of the wall; and (3) a second coat 34 of the SE roof coating applied over the first coat 30 and the AFF "L" section 32. These two coats of the SE roof coating material and the intervening AFF form a waterproof wrap covering the sheathing and provide a base for attaching the into mediate insulating layer 60 to be described with FIG. 4. The silicone elastomeric (SE) roof coating in this application may also be known and used as a liquid elastomeric seal. In addition (4) a weep screed 44 is attached to the wall sheathing 22 with flat head screws 46 with the angled edge of the weep screed 44 disposed approximately 5" to 6" above the foundation 12 and (5) a layer of fiberglass mesh 48 is applied to the wall 20 from the top to the angle formed in the weep screed 44 and secured to the wall 20 with staples 50. An extension of the lower edge of the fiberglass mesh 48 of approximately 12 inches is provided, to be secured later in the sequence when installing the intermediate insulating layer 60. In the foregoing process, it is preferred that the flat head screws 46 and the staples 50 are installed so that they are flush with the surfaces they secure to the wall 20, as shown in FIG. 3. In addition, it is essential that the SE roof coating be applied generously in the region where the weep screed 44, the AFF reinforcing layer 48, and the SE coating 62 on the back side of the insulating board 60 are in close proximity.

In some applications the foundation 12 is formed in a way that permits water to accumulate near the foot of the wall, thereby forming a shallow pool that may find its way through imperfect sealing at the bottom or foot of the wall. To provide a barrier to such water an optional curb 36 may be constructed of Portland Cement—Type I&II to prevent water leaking through the foot of the wall 20. If the optional curb 36 is to be used, it should be fabricated after the AFF section 32 and the second coat 34 of SE roof coating are applied as shown in FIG. 3. It is necessary to first construct a reinforcing structure formed of reinforcing bar (rebar) 38 supported on standoffs 40 embedded into the foundation 12. The standoffs 38 may alternatively be driven or screwed into the wall 20. The rebar 38 may be secured to the standoffs 40 using wire 42. After the reinforcing structure 38,40, 42 is installed, forms (not shown) to shape the curb 36 may be placed along the foot of the wall 20. In general the outward facing side of the curb 36 should slope downward and away from the wall 20 as shown to provide drainage.

Figure 4:
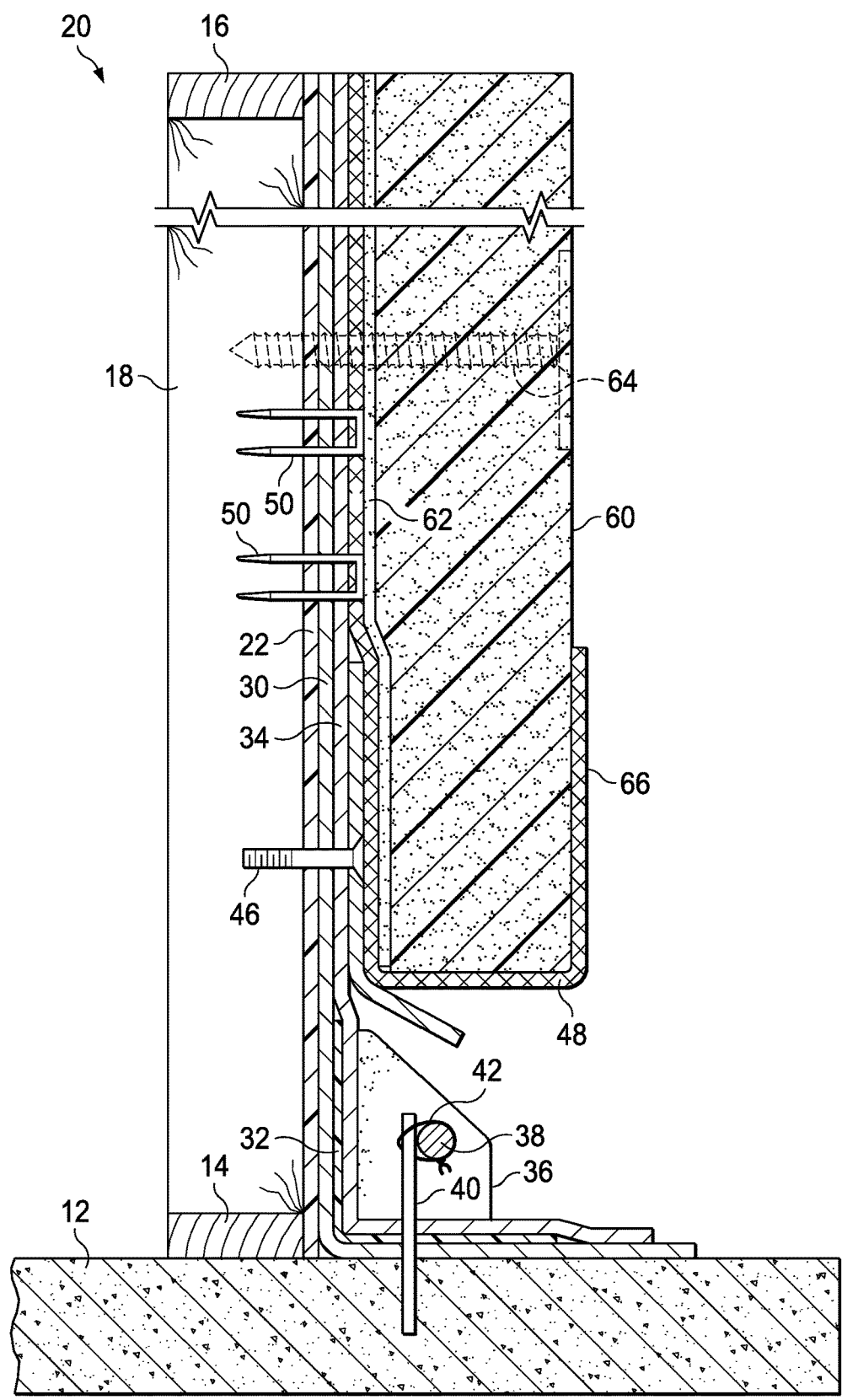
FIG. 4 illustrates an elevation cross section view of the wall structure of FIG. 3 depicting the addition of an insulating board over the inner layers.

FIG. 4 illustrates an elevation cross section view of the wall structure of FIG. 3 depicting the addition of an intermediate insulating layer 60 comprising an insulating board disposed over the inner layers 24. The insulating board 60 may preferably be a panel formed of a plurality of closed-cell, expanded polystyrene ("EPS") foam sheets, available from a variety of manufacturers. The EPS is generally available in sheets or panels 3 feet wide by 5 feet long, and thicknesses between 1 inch and 3 inches thick. In the present example, the closed cell EPS panels are 1½ inches thick, providing an R value of approximately 6.9. It is important that both sides of the sheets be uniformly smooth and free of openings, voids, grooves or other surface irregularities that could retain moisture. This includes EPS or other synthetic foam panels having a drainage plane—grooves in the surface of the panel—preformed on one side—i.e., the back side to be placed against a wall surface. In the present invention, panels of insulating material with such drainage planes are not acceptable. The present invention provides a cladded exterior wall that has no spaces within any of its layers or coatings or any unsealed openings through any of the layers. In other words the completed cladded exterior wall is a solid structure.

Installation of the insulating panels 60 proceeds as follows. First, the panels 60 are prepared by slightly roughening the surface of the side to be placed in contact with the fiberglass mesh 48. The purpose of the roughening step is to ensure a suitable surface for the silicone elastomeric roof coating, used as an adhesive, to bond well to the surface of the EPS insulating panel. After the roughening step, a coating 62 of the SE material is applied as an adhesive. This coating, which fills any irregularities in the surface that occurred during the roughening step, is called the "back-side coating" 62. Next, the panels of the insulating board 60 are positioned edge-to-edge against the layer of fiberglass mesh 48 previously applied, to cover the entire wall 20. Then the insulating board 60 may preferably be secured to the wall 20 using so-called "basket screws" 64, driven through the inner layers 24 into the sheathing 22. It is essential that pilot holes (not shown) for each basket screw 64 be pre-drilled through the insulating board 60, the inner layers 24, and into the sheathing 22. The pilot holes are then filled with a silicone caulking compound (a 40 year grade—not shown). Four to six basket screws per panel are preferred to secure the insulating panels 60 against the wall 20, primarily while the SE coating cures, to ensure a firm, sealed bond to the wall 20. The "basket screws" are equipped with enlarged flat metal washers to retain the heads from penetrating the EPS foam panels 60. Finally, the lower edge 66 of the fiberglass mesh 48 should be coated with a layer of SE (not shown), wrapped under the lower edge of the insulating board 60, and attached to the outward face of the lower edge of the insulating board. Cut-out openings for windows or utility access may be provided as needed. Such openings must be formed and sealed as will be described with FIG. 6.

Figure 5:
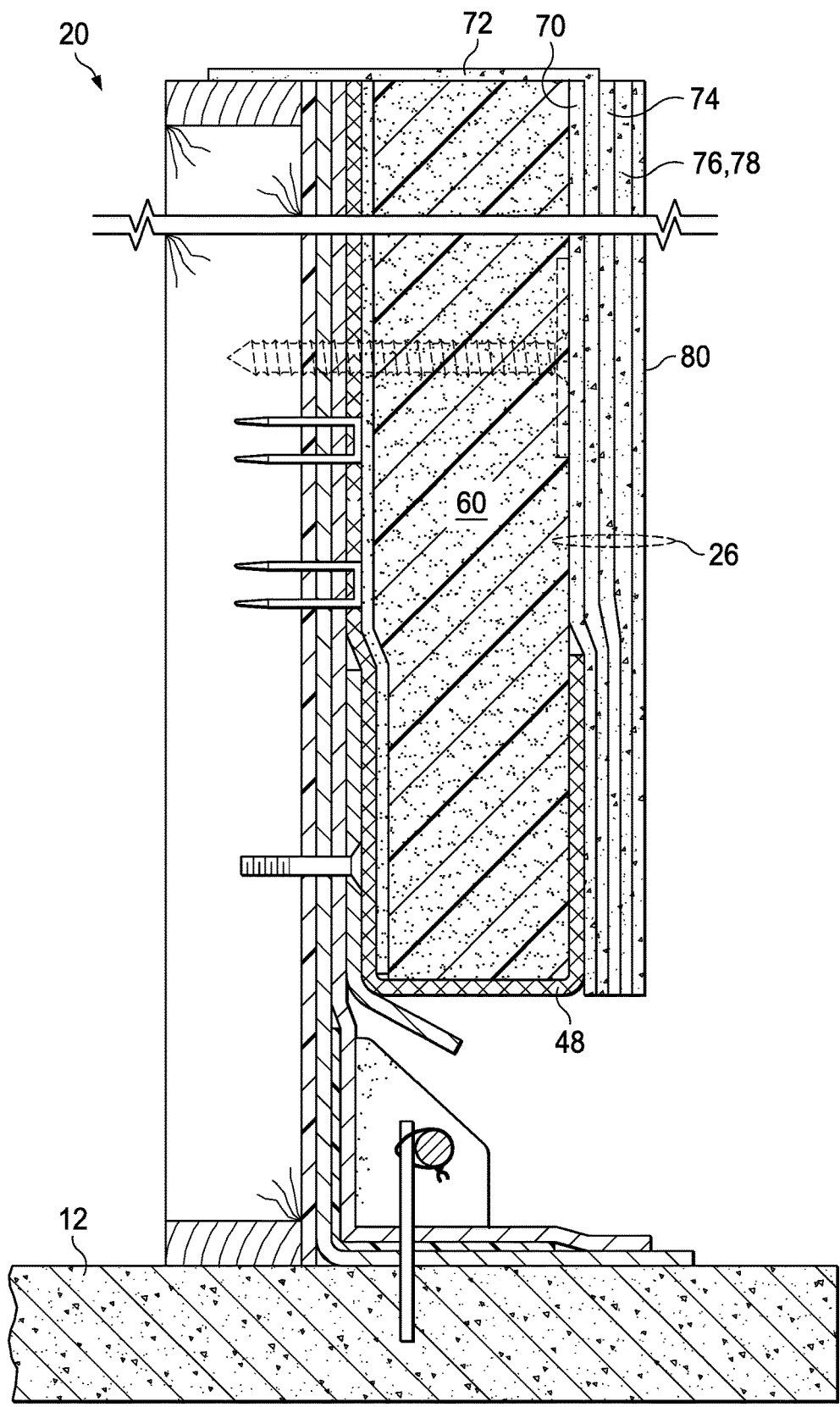
FIG. 5 illustrates an elevation cross section view of the wall structure of FIG. 4 depicting the outer layers of the present invention.

FIG. 5 illustrates an elevation cross section view of the wall structure of FIG. 4 depicting the outer layers 26 of the present invention. The outer layers 26 include a reinforced base coat plus the stucco layers of the exterior wall cladding system, thus providing a multi-layer stucco coating. The reinforced base coat is applied to support the stucco layers against the insulating board 60. The reinforced base coat includes a first coat 70 of a mixture of Portland Cement and Cement Adhesive ("PC/CA," or "cement/adhesive"), a layer of fiberglass mesh 72 that is preferably pressed into the first coat 70, and a second coat 74 of the PC/CA or cement/adhesive. It should be noted that the fiberglass mesh layer 72 must be wrapped upward and over the top of the wall 20 as shown to provide the best support for the PC/CA layers to be described. The Portland Cement and Cement Adhesive mixture used in the first 70 and second 74 coats is mixed as follows: one 94 lb. bag of Portland Cement with five gallons of the Cement Adhesive, or ½ of a 94 lb. bag of Portland Cement with 2½ gallons of the Cement Adhesive. A prescribed amount of time must be allowed after the fiberglass mesh layer 72 is applied for the first PC/CA coat 70 to set and cure before the second PC/CA coat 74 is applied. The second coat 74 must also be allowed sufficient time for the mixture to cure before subsequent steps are performed.

When the second PC/CA coat 74 is fully cured, at least one and preferably two synthetic stucco coatings are applied over the second PC/CA coat 74. The first and second coats 76, 78 of the synthetic stucco material—the Dryvit "DPR Finish" synthetic stucco coating—is the preferred material. These DPR Finish synthetic stucco coatings are available in various colors and are designed to withstand a wide range of weather conditions without cracking or deterioration. Finally, a finish coat 80 of the SE roof coating may be applied as a sealing coat to ensure that rain and moisture is easily shed.

Figure 6:
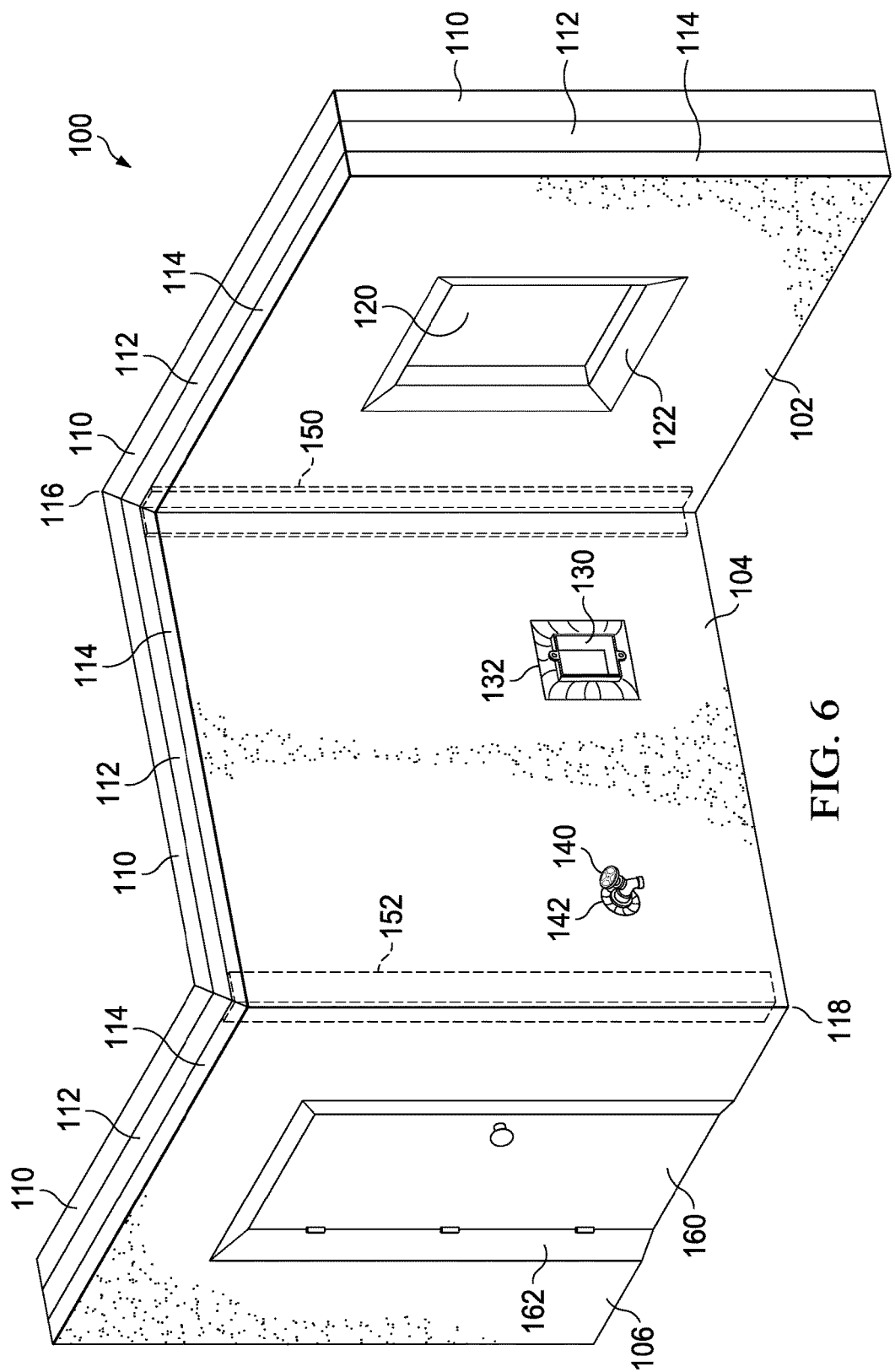
FIG. 6 illustrates a simplified perspective view of a three-part wall system according to the present invention to depict sealing treatment of passages through the wall such as windows and utility conduits.

FIG. 6 illustrates simplified perspective view of a three-part wall system according to the present invention to depict sealing treatment of passages through the wall such as windows, doors, and utility access conduits. The wall system 100 includes the sheathing (22) and inner (24) layers 110, the insulating board (60)—layer 122 including the adjoining coatings—and the stucco outer (26) layers 114. The three sections of the wall 100 are joined at first 116 and second 118 corners as shown. The corners 116, 118 may be reinforced with flashing strips 150, 152 respectively as shown by the dashed lines in FIG. 6. These flashing strips 150, 152, which may be made of metal or thermoplastic material, typically 6"×6" on each side of the angle, and may be applied after the insulating layer (60) 122 is installed. The flashing strips 150, 152 should be coated with SE coating and attached with screws inserted into pilot holes filled with caulking compound as described for the basket screws 64 as shown in FIG. 4. It should be pointed out that these uses of caulking compound to fill pilot holes are not exposed to the outside; rather these uses of caulking material are internal and sealed behind coats or layers of material.

A first exterior side 102 is depicted with a window opening 120 that is surrounded by a beveled frame 122. The beveled frame 122 may be formed by cutting through the outer layers 26 of the first exterior side 102 to produce an outward facing angle of approximately 45 degrees in this example. After smoothing the cut portions, a layer of AFF drywall tape may be applied, followed by one or more coats of the SE roof coating. The purpose of the 45 degree angle is to allow rain water to drain from the window 120.

Similarly, the second exterior side 104 is depicted with an opening housing an outlet box 130 for providing a receptacle (not shown) fir connecting to the electrical wiring of the building or a switch (not shown) for the control of an electrical circuit. The outlet box 130, set into the wall 104, may likewise be surrounded by an angled frame 132 that is formed of AFF drywall tape and sealed with the SE roof coating. As shown in the third exterior side 106, a water faucet 140 is mounted in an opening through the side 106. The opening is preferably wrapped with AFF drywall tape and sealed with the SE roof coating. These three examples illustrated in FIG. 6 depict the concept of wrap and seal that must be applied to all openings or passages through the exterior wall 100. These examples are not exhaustive; in fact persons skilled in the art will readily understand how the illustrated technique can be adapted to seal any opening in the wall 20.

Returning to FIG. 2, the side elevation view of a cross section of a completed structure that is cladded according to the present invention. The view of the wall structure 20 in FIG. 2 depicts the combination of sheathing 22, inner layers 24, an intermediate insulation layer 60, and outer layers 26 that together form the complete structure of the exterior wall cladding system 20, including the outer stucco finish 28 of the wall system 20. As has been described, all layers 24, 60, and 26 preferably include substantial amounts of sealing to ensure that no water or other forms of moisture can enter or pass through the wall structure 20. Upon completion of all layers of the wall structure 20, including the fiberglass mesh screen 72, the top flashing 92 is installed nit the top of the wall structure 20 and secured with screws 94 after coating the top of the wall structure 20 with the liquid silicone elastomeric (SE) 90. The top flashing 92 is typically disposed under the roof (not shown) adjoining the wall structure 20.

The structure and process for cladding of an exterior wall as described herein provides an improved stucco exterior wall, according to one embodiment of the present invention, is similar to a conventional stucco wall with several important differences: (1) the drainage plane and any other internal voids are eliminated, and (2) all surfaces and openings/passthroughs are sealed or secured to each other using combinations of a silicone elastomer (SE) roofing coating and an anti-fracturing fiber cloth (AFF cloth). The fabric materials are used as a sheet covering or as a tape to cover openings through the insulation panel such as utility passages, windows, doorways, etc., as has been described. The silicone elastomer (SE) roof coating is applied as a liquid to seal joints in the materials used. Other sealing components may be used to seal and protect corners and the base of the exterior wall where the stucco exterior is adjacent the building foundation. These differences form the departure in the state of the art provided by the present invention.

It has been found while installing the exemplary stucco exterior wall system described herein that the process is actually more efficient and faster because of the ease with which the liquid silicone elastomeric (SE) coating material can be applied. Although designed for covering roofs, particularly flat roofs, the SE roof coating material is ideally suited for the construction techniques described herein because of its durability, and its adhesive and sealing properties. Elimination of the drainage plane, especially the type formed by troweling or scratching the cement or other coating before application of the insulating layer the case of an EIFS system), eliminates a time-consuming task—a task that is often improperly done because of the time needed to perform it correctly—and one that when carelessly formed, can lead to major water damage and necessary reconstruction of the stucco exterior. Such reconstruction is even more expensive and time-consuming than the initial construction of the stucco exterior wall.

Persons skilled in the building construction arts will understand that various alternative but equivalent materials or mechanisms for sealing openings may be used as long as the integrity of the seal is maintained, and the materials and methods are capable of providing effective sealing for up to several decades. Further, the exterior wall cladding system described herein is compatible with various types of foundations and flooring structures. For example, in addition to a foundation constructed with a concrete floor, indoor or outdoor flooring or decking constructed of tiles or wood products (or synthetic equivalents thereof) may also be effectively and durably sealed using the techniques described herein that employ the silicone elastomeric roof coating and the anti-fracture fabric materials. Further examples such as flooring configured with artificial turf, concrete flooring coated with the silicone elastomeric roof coating, with or without some sort of aggregate such as pebbles or crushed rock, etc. may also be effectively sealed against water and insect damage.

Other examples of building surfaces that may be waterproofed using the teachings of the present invention include roofs of buildings and shower stalls or tiled walls or floors where a tiled surface is applied instead of stucco coatings.

Accordingly, two additional applications of the sealing methods developed for stucco walls will be described: one as a roofing system alternative to conventional asphalt shingles or metal roof coverings; the other as an alternative to conventional methods of sealing walls and floors for tiled surfaces such as shower stalls. The concepts described herein are readily applicable to waterproofing most kinds of walls, ceilings, roofs and floors, and any fixtures or other components that must pass through the wall, ceiling, roof or floor. Use of the methods and materials described herein provide surfaces that are substantially impervious to water or leaks of water through the substrate and the outer veneer of covering, while providing durable, economical solutions to constructing such panels.

Figure 7:
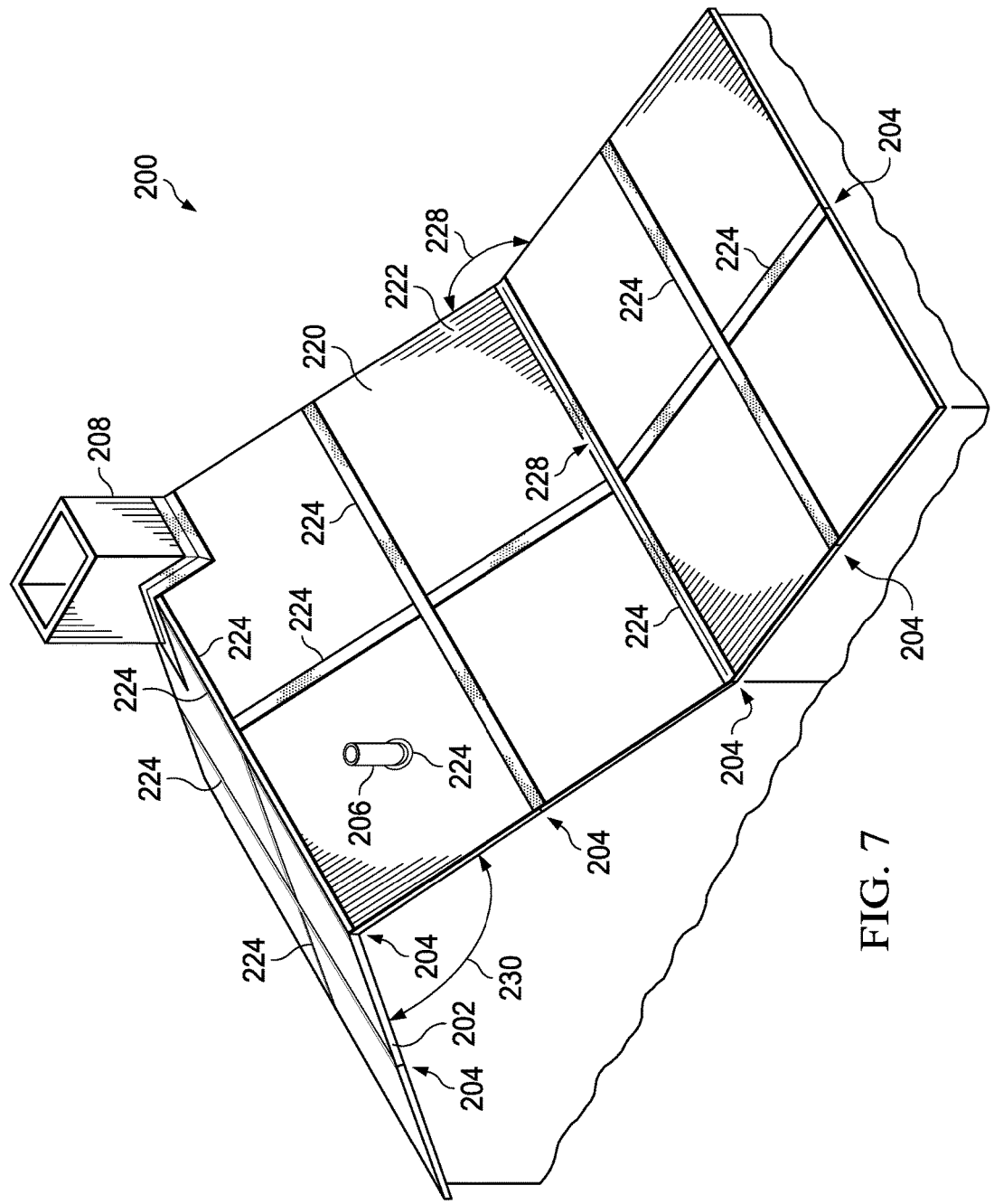
FIG. 7 illustrates a perspective drawing of a building shell having a root depicting components subject to the application of the roofing system according to an embodiment of the present invention.

FIG. 7 illustrates a perspective drawing of a simplified building shell having a roof, depicting components involved in the application of the roofing system 200 according to an embodiment of the present invention. The roof structure is formed by panels such as decking 202 joined at edges 203 forming joints 204, the term "joint" referring to the close proximity or contact of two surfaces. Such joints 204 may also be referred to as "seams." The edges 203 (See, e.g., FIG. 8) may meet or join at joints 204 within a plane, as in a flat roof, or at angles such as a trough 228 or a peak 230. In one step to be described all edges are covered by a strip of anti-fracture fabric (AFF) tape 224 as previously described, thereby forming seams. Also shown in FIG. 7 are a vent pipe 206 and a chimney 208 to represent typical structures that pass through the roof forming joints 204 that may or may not be in contact along the adjoining portions of the decking and wall structures. These joints 204 also require sealing against water and other weather events. Other examples (not shown) of pass-through structures include but are not limited to dormers, the walls of an upper story of the building, extensions of the roof over a porch, etc. The joints 204 of these vents 206, chimneys 208 (and other similar pass-through structures) with the decking 202 are also covered with the anti-fracture fabric tape 224 in a step to be described. The process for sealing the roof is described as follows and illustrated in FIGS. 8 and 9A through 9D.

There are two unique features of the roof system of the present invention. One is that the use of a single synthetic material—the silicone elastomeric (SE) roof coating—that is applied in three layers that bond together provides a unitary, integral waterproof coveting. The other unique aspect of the roof system described herein is that it uses no metal flashing materials, or nails, screws, or other types of fasteners as in conventional shingles or metal roofing that would otherwise penetrate the unitary, integral covering into decking or roof structure to secure the roof covering to the decking substrate. Moreover, because the silicone elastomeric (SE) roof coating has a 50 year lifetime, the finished roof covering is more durable than conventional metal or asphalt or wood—shingled roofs, while providing, a roof that is impervious to water, wind, and withstands impacts from hailstones up to 3 inches in diameter.

Figure 8:
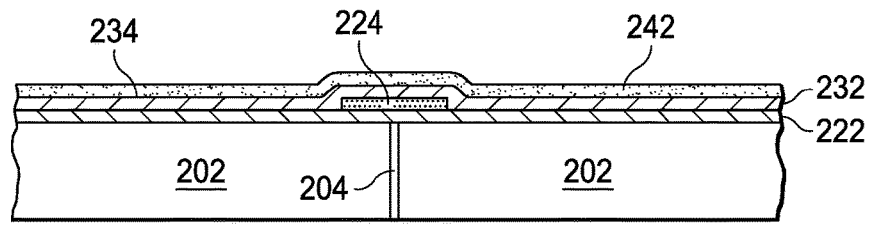
FIG. 8 illustrates a cross section view of a joint between edges of two adjoining roof decking panels or interior drywall panels, depicting the composition of a waterproof cover over the adjoining panels and the joints between their edges according to an embodiment of the present invention.

FIG. 8 illustrates a cross section or edgewise view of a joint or seam 204 between edges of two adjoining panels of roof decking 202 or interior drywall (substrate) 376. The drawing depicts the composition of a waterproof cover over the joints 204 between their edges according to an embodiment of the present invention. It will be understood that any two components placed proximate each other, as in edges 203 of panels or other structures that are adjoined, some in contact and some proximate but not in contact, form a joint 204 to be sealed according to the methods of the present invention. In a first step 222, a coat of synthetic roof coating, preferably the silicone elastomeric (SE) roof coating described previously and herein after called "SE roof coating," is applied in liquid form to the entire surface of the decking 202, including the joints 204 between the adjoining edges 203 of the decking 202.

In the second step shown in FIG. 8, a strip of APE tape 224 is applied over and along the joint 204. The APP tape 224, typically supplied in 6 inch widths, is suitable for this step. The SE roof coating also has adhesive properties that works in combination with the AFF tape 224 to both seal and reinforce the sealing structure at the seam or joint 204. The third step comprises a second coat 232 of the SE roof coating, again covering the entire surface of the decking 202 including the AFF tape 224. In the fourth step 242 a third coat of the SE roof coating mixed with washed silica sand, fine to medium grade. The mixture is formed by spraying on a light covering of the washed silica sand while the SE roof coating is still wet. The ratio of sand to SE roof coating is approximately 2 lb. per 100 sq. ft. The sand may be colored as desired. The result is a durable, light-colored, 100% waterproof roof that will withstand impacts from hail stones up to 3 inches diameter.

Figure 9A:
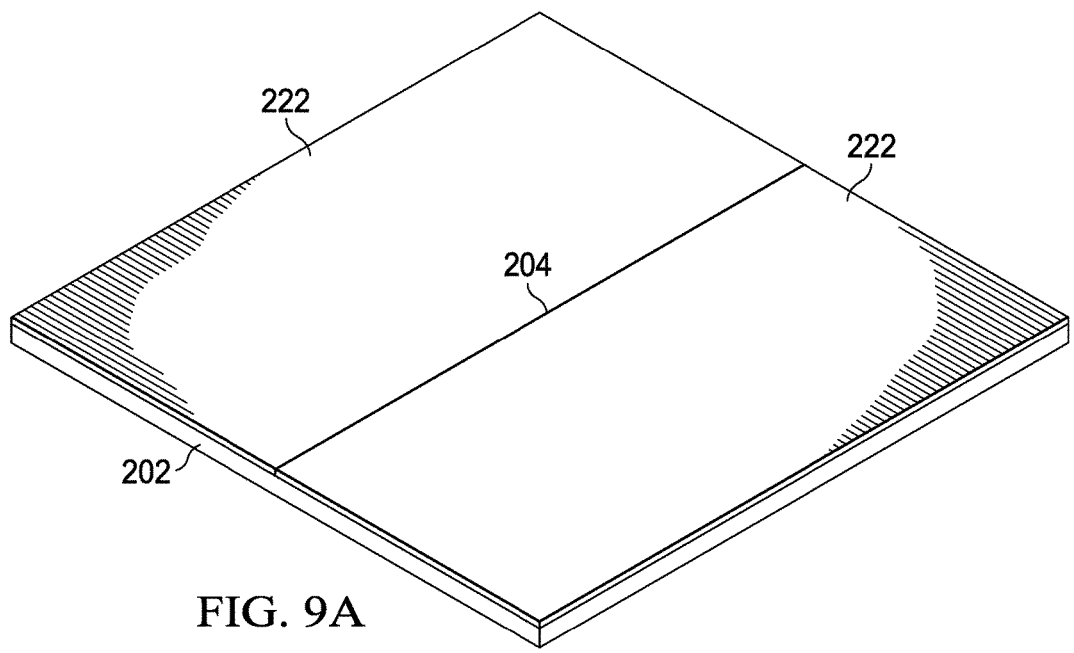
FIG. 9A illustrates a perspective view of two adjoined panels covered by a first coat of a roof coating.
Figure 9B:
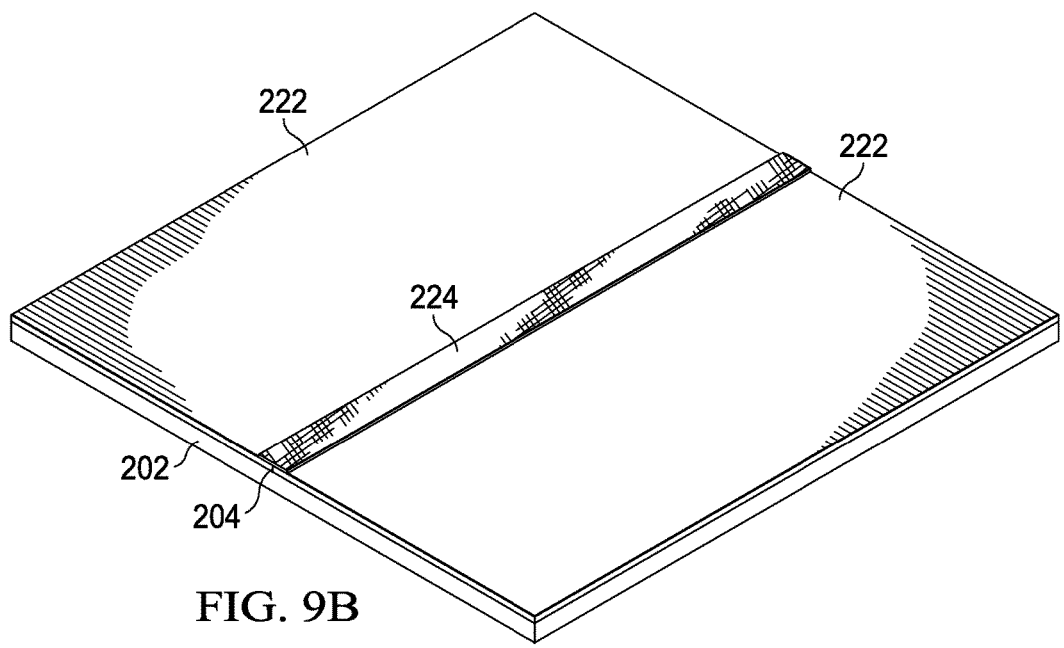
FIG. 9B illustrates a perspective view of the two adjoined panels of FIG. 9A covered by a strip of reinforcing fabric over adjoined edges of the coated panels of FIG. 9A.
Figure 9C:
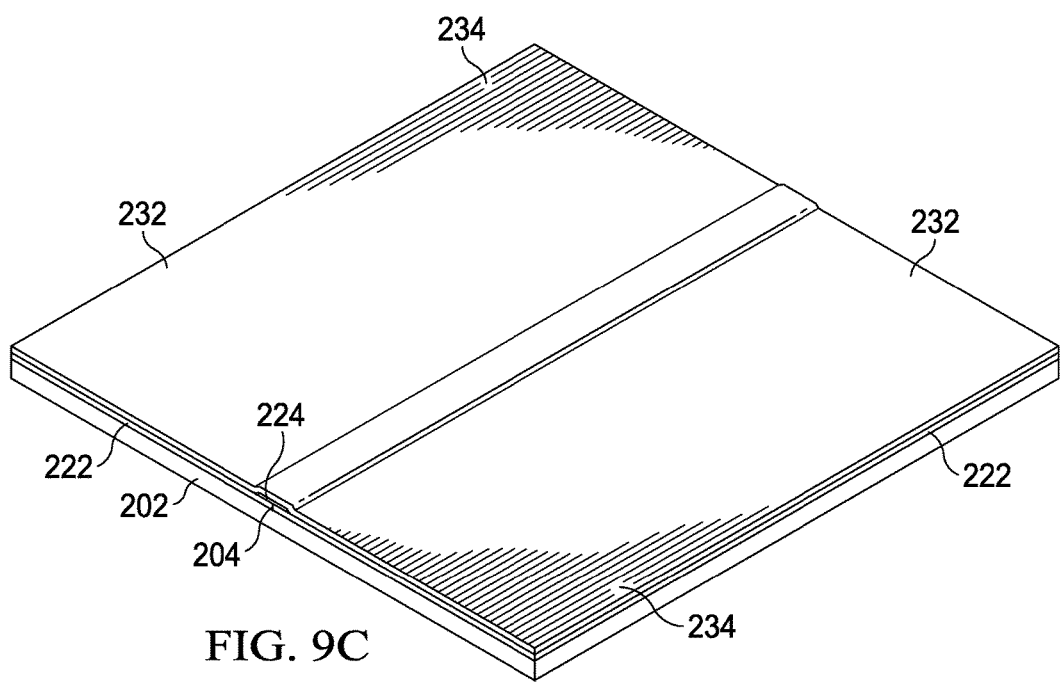
FIG. 9C illustrates a perspective view of the coated, adjoined panels covered by the reinforcing fabric along the adjoined edges and a second coat of the roof coating.

The process of sealing the decking 202 and installing the waterproof roof of FIG. 7 is described step-by-step with the aid of the illustrations of FIGS. 9A through 9D. FIG. 9A illustrates a perspective view of two panels—here decking 202 of a roof supported in edge-to-edge fashion by the building structure and covered by a first coat 232 of the SE roof coating. FIG. 9B illustrates a perspective view of the two coated panels of FIG. 9A with the addition of a strip of AFF tape 224 applied as reinforcing fabric over the joint 204 formed by the adjoined edges 203 of the coated panels of FIG. 9A. FIG. 9C illustrates a perspective view of the coated, adjoined panels of FIG. 9B after a second coat 232 of the SE roof coating has been applied over the entire surface of the decking 202 and the AFF taped joints 204.

Figure 9D:
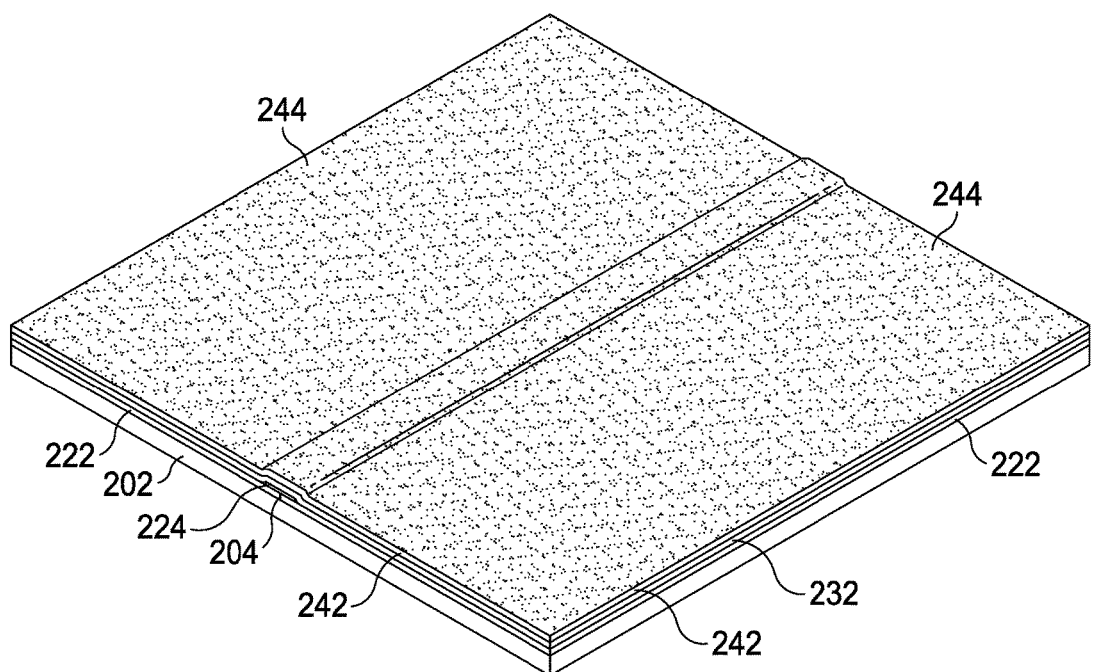
FIG. 9D illustrates a perspective view of the coated, adjoined panels covered by a third coat of a roof coating and a layer of washed silica sand deposited on the third coating.

FIG. 9D illustrates a perspective view of the coated, adjoined panels of FIG. 9C after being covered by a third coat 242 of the SE roof coating mixed with the light covering of washed silica sand 244 deposited—such as by spraying—on the third coat 242 of SE roof coating while the SE roof coating is still wet.

In a second alternative embodiment, for sealing a wall, to be covered with tiles, FIG. 10A illustrates an exploded perspective view of components of a tiled shower stall constructed according to the methods of the present invention. The methods employ the same basic process and materials as described for the roof covering in the preceding paragraphs. Accordingly, the same advantages of durability and imperviousness to water and insect damage are inherent in the shower stall construction to be described. In the illustrated example of FIG. 10A three sides of a shower stall 320 are shown as three panels of a drywall substrate 376 shown together but spread to depict the details of the wall surface to be covered with tiles. The FIG. 10A includes a shower pan 304 prepared on the foundation 308 of the structure (not shown) upon which the shower stall 320 is constructed. As is well known in the art, a shower pan built on a solid foundation that includes a concrete floor provides the stability of the shower needed to ensure long-term durability and freedom from leaks. The shower pan 304 includes a drain assembly 306 installed in the foundation 308. The drain 306 is involved in additional sealing steps to ensure a waterproof floor. The shower pan 304 is enclosed by a floor box 310 upon which the wall panels 376 of the shower stall 320 are installed. The shower pan 304 includes a tiled floor surface as will be described.

Continuing with FIG. 10A, construction of the floor portion of the shower pan 304 begins with step one: a first coat 332 of the SE roof coating applied to the surface of the foundation 308, the inside surface of the shower box 310, and the outer portions of the drain 306, followed by a wrap 334 of the AFF tape around the adjoining (or proximate) portions of the foundation 308 and the drain 306. The SE roof coating is applied at a rate of approximately one gallon per 100 square feet or, alternatively, to a thickness of approximately 1/16 inch. When the first coat 332 and the wrap 334 is dry, a second coat 342 of the SE roof coating is applied over the first coat 332 and the wrap 334 around the drain 306/foundation 308 joint. While the second coat 342 is still wet, a layer of gravel aggregate 344 is deposited on the floor portion of the coated foundation. When the second coat 332 with the gravel aggregate 344 dries, the resulting surface will bond effectively with the concrete 346 that is applied and formed into the shower pan 304, using, for example, traditional hand-forming with a trowel. Although not shown in FIG. 10A for clarity, it is understood that the concrete portion of the shower pan includes vertical sides that conform to the inside of the shower box. It is also understood that each coat of the elastomeric is also applied to the inside vertical portion of the shower box.

After concrete 346 has hardened, a third coat 352 of the SE roof coating is applied to the concrete 346 and around the drain 306 to provide a membrane seal of the inside surfaces of the shower box 310 to the concrete 346 covering the floor of the shower pan 304. While the third coat 352 is still wet, the tiles 362 may be set into the third coat 352 and aligned according to the desired design. The adhesive property of the SE roof coating will hold the tiles 362 in place until the SE roof coating sets and dries. After drying, a grout material 372 may be applied with a trowel into the arrow spaces bets peen the tiles 362. The grout may be, for example, a mixture of ½ bag of washed silica sand with 2½ gallons of the SE roof coating. FIG. 10B depicts an enlarged arrangement of tiles 302 or 362 installed on a coated surf act, of the substrate 376 with the grout 372 in place.

Continuing with FIG. 10A, the walls f the shower stall 320, formed by the substrates 376, are prepared to receive the tiles 302 in a similar manner as for the shower pan 304. Installed in the center panel are fixtures including but not limited to faucets 384 and a shower head 386. In the first step, a first coat 332 of SE roof coating is applied to the surface of the substrate 376, followed by a strip or wrap 334 of the AFF tape around the opening or joint between the substrate and the fixtures 384, 386, respectively at joints 382 and 380. The joints 204 between the edges of the substrate 376 panels are also covered along the lengths of the joints 204 with a strip 334 of the AFF tape.

In step two, a second coat 342 of the SE roof coating is applied to the covered surface of the substrate 376. Joints 204, 380, 382 are wrapped, i.e., covered, with the AFF tape. When it is time to install die tiles 302 in the third step, a third coat 352 of the SE roof coating is, applied over the second coat 342 to provide membrane seal. While the third coat 352 is still wet, the tiles 302 may be installed in the desired arrangement, followed by the grout 372 as described previously and depicted in FIG. 10B.

Persons skilled in the art will recognize that certain steps in the processes described herein must allow sufficient time for the materials to set, dry, or cure before succeeding steps are carried out. The required time will depend on local weather, temperature, and seasonal conditions. Also to be noted is that the silicone elastomeric (SE) roof coating is used as both an adhesive and a membrane in the disclosed systems and methods for cladding walls, roofs and tiled surfaces. Similarly, the anti-fracture fabric AFF tape is used as a reinforcing layer, a wrap around components that penetrate the wall system, or as flashing strips. Further, the use of synthetic materials are virtually impervious to insects as long as all openings are fully sealed. It should be understood that the foregoing sealing methods are accomplished without metal flashing or other similar components, the reason is that the h roof coating is not subject to corrosion when wet, thus eliminating the gradual deterioration of metallic components and degradation of the constructed seal.

CONCLUSION

While the invention has been shown in only one of its forms, it is not thus limited but is susceptible to various changes and modifications without departing from the spirit thereof. The exterior wall cladding system is also compatible with various outer veneers or wall coverings such as brick, stone, wood or synthetic siding materials, or even roof coverings instead of stucco finishes. The system may also be used on curved wall surfaces by using sheathing and insulating board techniques to provide the needed curvature. Broadly stated, the invention is a waterproofing system for composite, layered panels used in buildings or any structure including even vehicles, trucks, shipping containers, etc. where it is important to provide wall structures or other types of panels, roofs, or floors that must be constructed to be impervious to water, weather, and insect pests.

Persons skilled in the art will also recognize that the principles of the concepts described herein are readily applicable to waterproofing most composite layered panels used in buildings and vehicles. In other words, whenever it is necessary to configure panels of buildings and vehicles (in particular trucks, shipping containers, railroad cars, etc.) with waterproof cladding such as walls, floors, ceilings, roofs and the like so that they are substantially impervious to water or leaks of water through the panels, the system and methods described herein provide durable, economical solutions to waterproofing such panels.

What is claimed is:

1. An alternative roofing system, comprising:
   a plurality of decking panels installed over a framed structure, the panels joined at edge-to-edge seams;
   a first coat of a liquid silicone elastomeric (SE) roof coating applied along edge-to-edge seams of the decking panels and between adjoining portions of the decking panels and, if present, along boundaries with structures passing through the decking panels;
   a non-metallic flashing strip formed of anti-fracture fabric (AFF) applied exclusively to the first coat of SE roof coating covering the edge-to-edge seams of the decking panels and adjoining portions of the decking panels and structures passing through the decking panels, thereby forming a continuous cover over the seams and adjoining portions;
   a second coat of the SE roof coating applied over the decking panels and the adjoining portions including the first coat of the SE roof coating and the non-metallic flashing strips, to form a coated, waterproofed surface on the roof; and
   a mixture of washed silica sand and a third coat of the SE roof coating applied over the second coat of the SE roof coating, wherein the washed silica sand is mixed into the third coat of the SE roof coating at a rate of approximately two pounds per hundred square feet; wherein
   the second and third SE roof coatings are combined with the non-metallic flashing strips bonded to the decking panels to form the alternative roofing system.

2. The alternative roofing system of claim 1, wherein:
   the liquid SE roof coatings and the anti-fracture fabric (AFF) are installed without nails, screws or other fasteners that penetrate the combined roof coatings, the non-metallic flashing strip, and the decking panels.

3. The alternative roofing system of claim 1, wherein:
   the edge-to-edge seams include junctions of decking panels meeting in a plane and at an angle forming a trough or a hip joint.

4. The alternative roofing system of claim 1, wherein:
   the non-metallic flashing strip of AFF is applied over the edge-to-edge seams while the first coat of the SE roof coating is still liquid;
   the first coat of SE roof coating is allowed to dry before the second coat of SE roof coating is applied; and
   the second coat of SE roof coating is allowed to dry before the mixture of the silica sand and the third coat of SE roof coating is applied.

5. The alternative roofing system of claim 1, wherein each first, second and third coat of the SE roof coating is applied to the decking panels at a rate of approximately one gallon per 100 square feet of area.

6. The alternative roofing system of claim 1, wherein:
   each first, second and third coat of the SE roof coating is applied to the decking panels to a thickness of approximately $1/16$ inch.

7. The alternative roofing system of claim 1, wherein:
   the non-metallic flashing strip of AFF covering the edge-to-edge seams, the structures passing through the decking panels, and the adjoining portions of the decking panels that meet at an angle, is applied as a strip approximately six inches wide after the first coat of SE roof coating is applied.

8. The alternative roofing system of claim 1, wherein:
   the structures passing through the decking panels include one or more of the group consisting of HVAC ventilation devices and outlets, heater vents, chimneys, windows, skylights, and dormers.

* * * * *